United States Patent [19]
Looney et al.

[11] Patent Number: 5,753,109
[45] Date of Patent: May 19, 1998

[54] APPARATUS AND METHOD FOR PHOSPHATE-ACCELERATED BIOREMEDIATION

[75] Inventors: Brian B. Looney, Aiken, S.C.; Susan M. Pfiffner; Tommy J. Phelps, both of Knoxville, Tenn.; Kenneth H. Lombard; Terry C. Hazen, both of Augusta, Ga.; James W. Borthen, Seattle, Wash.

[73] Assignee: The United States of America as represented by the United States Department of Energy, Washington, D.C.

[21] Appl. No.: 579,910

[22] Filed: Dec. 28, 1995

Related U.S. Application Data

[63] Continuation-in-part of Ser. No. 186,065, Jan. 25, 1994, Pat. No. 5,480,549.

[51] Int. Cl.⁶ .................... C02F 3/34; E21B 43/22
[52] U.S. Cl. .................... 210/149; 210/170; 210/251; 166/68; 405/128
[58] Field of Search .................... 210/610, 612, 210/614, 747, 170, 149, 251; 166/68, 246; 405/128, 129

[56] References Cited

U.S. PATENT DOCUMENTS

| | | | |
|---|---|---|---|
| 3,846,290 | 11/1974 | Raymond | 210/11 |
| 4,401,569 | 8/1983 | Jhaveri et al. | 210/610 |
| 4,749,491 | 6/1988 | Lawes et al. | 210/610 |
| 4,765,902 | 8/1988 | Ely et al. | 210/610 |
| 4,849,360 | 7/1989 | Norris et al. | 435/264 |
| 4,850,745 | 7/1989 | Hater et al. | 405/258 |
| 5,018,576 | 5/1991 | Udell et al. | 210/610 |
| 5,178,491 | 1/1993 | Graves et al. | 405/128 |
| 5,279,740 | 1/1994 | Basile et al. | 210/610 |
| 5,286,140 | 2/1994 | Mather | 210/610 |
| 5,302,286 | 4/1994 | Semprini et al. | 210/610 |

*Primary Examiner*—Thomas G. Wyse
*Attorney, Agent, or Firm*—Harold M. Dixon; William R. Moser; Paul A. Gottlieb

[57] ABSTRACT

An apparatus and method for supplying a vapor-phase nutrient to contaminated soil for in situ bioremediation. The apparatus includes a housing adapted for containing a quantity of the liquid nutrient, a conduit in communication with the interior of the housing, means for causing a gas to flow through the conduit, and means for contacting the gas with the liquid so that a portion thereof evaporates and mixes with the gas. The mixture of gas and nutrient vapor is delivered to the contaminated site via a system of injection and extraction wells configured to the site and provides for the use of a passive delivery system. The mixture has a partial pressure of vaporized nutrient that is no greater than the vapor pressure of the liquid. If desired, the nutrient and/or the gas may be heated to increase the vapor pressure and the nutrient concentration of the mixture. Preferably, the nutrient is a volatile, substantially nontoxic and nonflammable organic phosphate that is a liquid at environmental temperatures, such as triethyl phosphate or tributyl phosphate.

10 Claims, 4 Drawing Sheets

APPARATUS AND METHOD FOR PHOSPHATE-ACCELERATED BIOREMEDIATION

RELATED APPLICATIONS

This application is a continuation-in-part of U.S. application Ser. No. 08/186,065 filed on Jan. 25, 1994, now U.S. Pat. No. 5,480,549.

BACKGROUND OF THE INVENTION

1. Field of the Invention

The present invention relates to in situ bioremediation of contaminated soil and groundwater. In particular, the invention relates to an apparatus and method for adding vapor-phase nutrients to a contaminated subsurface region to stimulate the growth of contaminant-degrading microorganisms. The United States Government has rights in this invention pursuant to Contract No. DE-AC09-89SR18035 between the U.S. Department of Energy and Westinghouse Savannah River Company.

2. Discussion of Background

Soil and groundwater contamination are ranked among the most serious pollution problems of the industrialized nations. It is estimated that over 15% of community drinking water supplies in the United States are contaminated with chlorinated hydrocarbons. Contamination damages the local ecosystem and may pose health problems if local groundwater is used as a source of drinking water or irrigation water, or if the soil is used for growing crops.

A number of methods are available for treating contaminated soil and groundwater. Soil can be treated simply by excavation and off-site disposal. Groundwater may be removed along with excavated soil or be pumped to the surface of the earth for treatment. In situ remediation techniques include stripping of volatile contaminants, as in the horizontal well systems described by Corey et al. in commonly-assigned U.S. Pat. Nos. 4,832,122 (In Situ Remediation and Method for Contaminated Groundwater) and 5,186,255 (Flow Monitoring and Control System for Injection Wells), the disclosures of which are incorporated herein by reference.

Bioremediation of contaminated sites relies on natural processes to break down, immobilize or detoxify the contaminated soil or water. Bioremediation techniques are effective for treating many organic contaminants, however, bioremediation may be inefficient and time-consuming when compared to other treatment methods. Many months of treatment may be needed before contamination is reduced to acceptable levels.

Remediation rates can be increased by increasing the supply of nutrients for the indigenous contaminant-degrading microorganisms, for example, by increasing the concentrations of oxygen, nitrogen and phosphorous at the site, and adding trace inorganic nutrients such as iron, magnesium and manganese. In addition, indigenous microbial populations may be supplemented with naturally-occurring or genetically altered exogenous microorganisms. When the contaminant concentration decreases to acceptable levels, the nutrient supply is terminated and the microbial population returns to background pretreatment levels. For example, Jhaveri, et al. (U.S. Pat. No. 4,401,569) pump contaminated groundwater to the surface, add microorganisms and nutrients such as oxygen, nitrogen, and carbon dioxide, then return the mixture to the ground for recirculation through the contaminated area to leach out and biodegrade the contaminants.

Instead of pumping contaminated groundwater to an above-ground treatment center, water, oxygen, and nutrients such as phosphates, nitrates and alkali metals may be supplied in situ via injection wells. See Ely et al. (U.S. Pat. No. 4,765,902), Raymond (U.S. Pat. No. 3,846,290), Norris et al. (U.S. Pat. No. 4,849,360). Bacterial cultures can be added to the site, together with air and nutrients, thereby facilitating metabolization of hydrocarbons in the soil (Hater et al., U.S. Pat. No. 4,850,745).

Treatment may include the methods disclosed in commonly assigned patent applications Ser. No. 07/935,950, filed Aug. 27, 1992 (Bioremediation of Contaminated Groundwater) and Ser. No. 07/896,762, filed Jun. 10, 1992 (Method and System for Enhancing Microbial Motility), the disclosures of which are incorporated herein by reference. In the former application (Ser. No. 07/935,950), nutrients are injected cyclically to stimulate the growth and reproduction of indigenous microorganisms that are capable of aerobically degrading the contaminants. Treatment is carried out by periodically injecting a mixture of the nutrient and an oxygenated fluid, followed by injection of the oxygenated fluid alone. The nutrient builds up the concentration of microbes capable of degrading the contaminants; the absence of the nutrient forces the microbes to degrade the contaminants in an oxygen-enriched, aerobic environment for that degradation. Treatment is continued until the subsurface concentration of contaminants is reduced to a preselected level. The latter application (Ser. No. 07/896,762) discloses attracting indigenous microbes to the site by placing a quantity of tetrachloroethylene (TCE) near the contaminants.

The effectiveness of these techniques is limited by the ability to effectively disperse a sufficient supply of nutrients throughout the contaminated site. Injection of liquid nutrients (including liquids, liquid droplets and aerosols) has not been successful because liquids tend to adsorb to the soil near the injection location, thus do not disperse to provide general stimulation in the entire contaminated site. The resulting high concentration of nutrients near the injection point can lead to biological growth so immediate and rapid that it plugs the injection well, precluding further injection.

Nutrients that are supplied in gaseous form diffuse much more readily throughout the site, and thus are available to microorganisms at the site. Many nutrients, including oxygen, nitrogen, carbon dioxide, ammonia and methane, are widely available in gaseous form. However, there are no nontoxic compounds of phosphorous, a necessary nutrient for growth and reproduction, that are gaseous at environmental temperatures. Therefore, phosphorous is usually supplied in aqueous solution (Lawes et al., U.S. Pat. No. 4,749,491; Raymond, U.S. Pat. No. 3,846,290) or as an air-vapor mixture (Graves et al., U.S. Pat. No. 5,178,491). Graves et al. contact a phosphoric acid solution with a carrier gas (such as air) so that the gas picks up some of the phosphate molecules, then inject the mixture into a bioremediation site. Phosphoric acid ($H_3PO_4$) is formed by dissolving solid phosphorus pentoxide ($P_2O_5$) in water, thus, the phosphate concentration of the gas-vapor mixture is limited by the vapor pressure of the dissolved solid. Only a small fraction of the phosphorous in the solution is available for vapor-phase transport; most of the phosphorous is in the form of dissociated phosphate ions, which remain in solution and cannot evaporate into the gas. Consequently, large volumes of phosphoric acid are needed for sufficient nutrition. In addition, phosphoric acid is corrosive and difficult to handle, and the system does not allow precise control of the amount of phosphate transferred to the gas.

There is a need for an efficient, cost-effective method for delivering vapor-phase nutrients, particularly phosphates, to contaminated soil and groundwater to enhance in situ bioremediation. The ability to supply controlled amounts of phosphorous is critical to the future success and reliability of in situ bioremediation technologies.

SUMMARY OF THE INVENTION

According to its major aspects and broadly stated, the present invention is an apparatus and method for supplying a vapor-phase nutrient to contaminated soil. The apparatus includes a housing adapted for containing a quantity of a volatile liquid nutrient, a conduit in fluid communication with the interior of the housing, and means for contacting a gas flowing through the conduit with the nutrient so that a portion thereof is vaporized and transferred to the gas. The resulting gas-nutrient mixture is delivered to the contaminated site via a system of injection and extraction wells configured to the site.

In use, a gas such as air or nitrogen is flowed through the apparatus where a portion of the liquid nutrient evaporates and is transferred to the gas in vapor form. Remediation is carried out by injecting the mixture of gas and nutrient vapor into the contaminated site. The mixture is drawn through the site so that the nutrient is available to stimulate growth and reproduction of subsurface microorganisms that are capable of degrading the contaminants. Treatment is continued until the contaminant concentration at the site is reduced to acceptable levels.

An important feature of the invention is the mixing of carrier gas with a liquid. A predetermined quantity of the liquid nutrient (up to the vapor pressure of the liquid) is transferred to a carrier gas flowing through the conduit, allowing delivery of controlled amounts of nutrient vapor to the site. Because the nutrient is delivered to the site in vapor form, it readily disperses throughout the site without clogging and is available to stimulate growth of subsurface contaminant-degrading microorganisms. The transfer of liquid to the carrier gas may be achieved using a countercurrent flow contactor, sparger, bubbler, diffuser or infusion pump.

Another important feature of the present invention is the choice of nutrient, preferably a volatile, substantially nontoxic and nonflammable organic phosphate that is a liquid at environmental temperatures, such as triethyl phosphate or tributyl phosphate. Because of its high vapor pressure, the liquid evaporates readily and mixes with the gas, thus, a mixture containing a high concentration of nutrient vapor can be delivered throughout the bioremediation site. Unlike solutions formed by dissolving solid compounds into a liquid, where only a small fraction of dissolved molecules can evaporate due to the low vapor pressure of the dissolved compound, substantially all of the liquid nutrient is available for evaporation and transfer to the gas.

Still another feature of the present invention is the combination of injection and extraction wells to establish a flow gradient through the soil. By properly configuring the wells in view of the size and shape of the contaminated plume, the subsurface geology of the area, groundwater flow rates in the area, and drilling economics, the entire plume or any part can be quickly saturated with the microbial nutrient.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a schematic view of an apparatus according to a preferred embodiment of the present invention;

FIG. 2 is a schematic view of an apparatus according to another preferred embodiment of the invention;

FIG. 3 shows a bioremediation apparatus according to the invention;

FIG. 4 is another bioremediation apparatus according to the invention;

FIG. 5 is a perspective view of a preferred embodiment of the valve assembly of a barometric pump;

FIG. 6 is a cross-sectional view taking a long line 6—6 of FIG. 5;

FIG. 7 shows a bioremediation apparatus using a barometric pump according to the invention; and FIG. 8 is a perspective in partial section illustrating additional details of an apparatus according to the present invention.

DETAILED DESCRIPTION OF A PREFERRED EMBODIMENT

In the following description, similar components are referred to by the same reference numeral in order to simplify the understanding of the sequential aspect of the drawings.

Referring now to FIG. 1, there is shown a schematic view of an apparatus according to preferred embodiment of the present invention. An apparatus 10 for supplying vapor-phase nutrients includes a housing 12 with an inlet 14 and an outlet 16. If desired, a reservoir 18 is provided, in fluid communication with housing 12. A first pump 20 pumps a carrier gas to inlet 14 through a first conduit 22; a second pump 24 pumps gas from outlet 16 to a second conduit 26. Housing 12 contains a gas-liquid contactor device 28, such as a countercurrent contactor, diffusor, bubbler or sparger. Housing 12 and reservoir 18 contain a liquid nutrient 30, to be described below.

A carrier gas, represented by arrows 32, is pumped through conduit 22 into device 28 by first pump 20. As carrier gas 32 contacts liquid nutrient 30, a portion of liquid nutrient 30 evaporates and is transferred to carrier gas 32. The resulting mixture of gas and nutrient vapor, represented by arrows 34, is pumped into conduit 26 by second pump 24. As more and more of liquid nutrient 30 evaporates, additional liquid nutrient 30 may be supplied to housing 12 from reservoir 18 (if present).

Housing 12 may be provided with means for changing the temperature of liquid nutrient 30 in order to change its vapor pressure. The vapor pressure of a substance is defined as the pressure exerted by a vapor in equilibrium with the substance. The vapor pressure is proportional to the temperature, as given by Antoine's equation:

$$\log P_v = A-(B/(T+C),$$

where $P_V$ is the vapor pressure, T is the absolute temperature (°C.+273.15), and A, B and C are constants for a particular substance. Thus, nutrient 30 may be heated to increase its vapor pressure and transfer a greater amount of vapor to carrier gas 32, or cooled to decrease the vapor pressure and transfer less vapor to carrier gas 32. Housing 12 may be provided with internal or external heating coils for heating liquid nutrient 30, a heating/cooling jacket in thermal contact with the wall of housing 12, or a conduit 40 in thermal contact with housing 12 that carries waste heat from other apparatus (not shown) at the bioremediation site.

Figure 1:
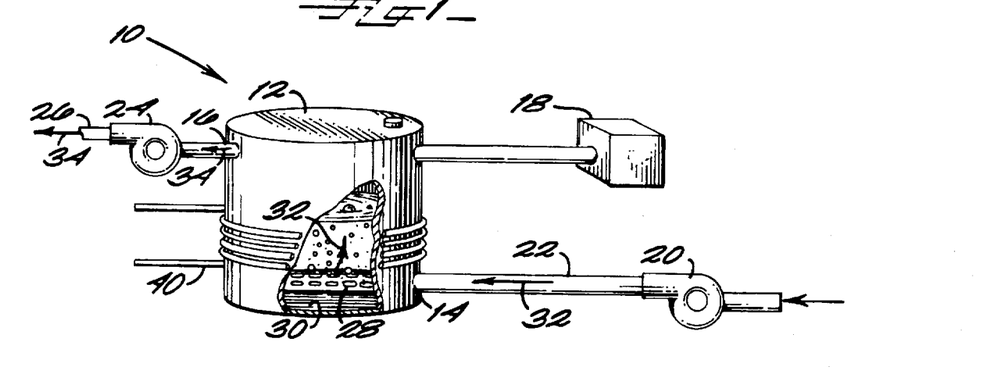
Figure 2:
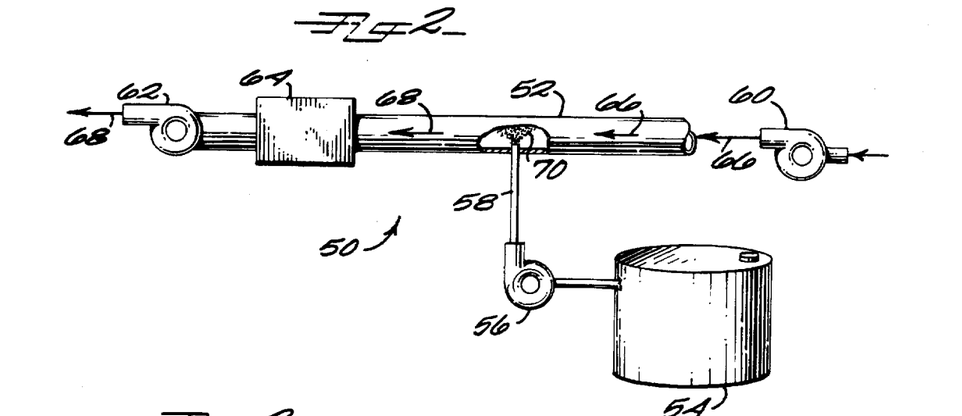

An alternative preferred embodiment of the present invention is shown in FIG. 2. An apparatus 50 includes a conduit 52, a housing 54 containing a liquid nutrient such as liquid nutrient 30, a pump 56, and a conduit 58 in fluid communication with conduit 52. Pump 56 is any type of pump that is capable of injecting predetermined, controlled amounts of the liquid nutrient into conduit 52, including but not limited to an infusion pump, a syringe pump, or a high pressure liquid chromatography (HPLC) pump.

A first pump 60 draws a carrier gas to conduit 52; a second pump 62 pumps a mixture of the gas and nutrient vapor from conduit 52 to a bioremediation site (not shown). An in-line mixer 64 may be provided for enhancing the mixing of vaporized nutrient with the carrier gas. Mixer 64 is any device that causes turbulent flow in the interior of conduit 52 so that carrier gas and nutrient vapor flowing through the conduit 52 are well mixed.

Pump 60 pumps a carrier gas, represented by arrows 66, into conduit 52. Infusion pump 56 draws liquid nutrient from housing 54 and injects a controlled amount of the nutrient directly into conduit 52, where the nutrient immediately disperses into a vapor 70. Mixer 64 (if present) ensures that the carrier gas 66 and vapor 70 are well mixed. Nutrient-enriched gas represented by arrows 68 is drawn from conduit 52 by second pump 62. If desired, the temperature of carrier gas 66 or the liquid nutrient, or both, may be controlled in order to control the vapor pressure of the liquid nutrient.

Carrier gas 66 can contain an amount of nutrient no greater than the vapor pressure of the liquid nutrient, that is, the partial pressure of the vaporized nutrient in the gas-vapor mixture is no greater than the vapor pressure of the liquid nutrient. Therefore, the maximum flow rate of pump 56 is given by:

$$Q_{max} = \beta_1 \beta_2 Q_{gas},$$

where $Q_{max}$ is the flow rate of the liquid nutrient in L/min, $Q_{gas}$ is the flow rate of the carrier gas (the pumping rate of pump 60) in L/min, $\beta_1$ is the vapor pressure of the liquid nutrient in atm, and $\beta_2$ is a conversion factor relating the flow rate of the liquid nutrient to the flow rate of the vaporized nutrient. Conversion factor $\beta_2$ is a constant for a particular substance, approximately given by:

$$\beta_2 = 4.1 \times 10^{-5} \, (w/d),$$

where $w$ is the molecular weight of the liquid nutrient in g/mole and $d$ is its density in g/cm$^3$. Preferably, the liquid nutrient is supplied at a flow rate between approximately 0.1 mL/min and 10 mL/min.

The flow rate needed to obtain a gas-vapor mixture containing a predetermined vol. % of nutrient vapor is given by:

$$Q_{target} = (V/100) \beta_2 Q_{gas}, \text{ or}$$

$$Q_{target} = 4.1 \times 10^{-7} \, (w/d) V Q_{gas},$$

where $Q_{target}$ is the flow rate of the liquid nutrient (the flow rate of infusion pump 56) and V is the desired vol. % of nutrient vapor in the gas-vapor mixture.

Apparatus 10 and apparatus 50 may be operated with a carrier gas such as air, oxygen-enriched air, nitrogen, oxygen-nitrogen mixtures, and so forth. The optimum choice of carrier gas depends on the types of contaminants present in at the site, the nutrients present in the soil, and whether anaerobic or aerobic degradation, or both, is to be stimulated. Thus, for anaerobic degradation, the carrier gas may be nitrogen; for aerobic degradation, air, oxygen-enriched air, or nitrogen-oxygen mixtures. If desired, the mixture may contain other gases such as methane, propane, carbon dioxide and so forth.

Suitable nutrients for the practice of the invention include volatile, substantially nontoxic and nonflammable compounds that are liquid at environmental temperatures (that is, temperatures between approximately −20° C. and 50° C.). The compounds contain needed nutrients (nitrogen, phosphorous, etc.) in forms that can be metabolized by subsurface microorganisms. By "liquid" is meant substantially pure compounds that are liquids in at least a portion of this temperature range, as opposed to soluble compounds and solutions thereof. Liquids are preferred since, in general, liquids have higher vapor pressures than solids. The higher the vapor pressure, the greater the concentration of vaporized nutrient in the gas-vapor mixture supplied by apparatus 10, 50, and the more efficient the delivery of nutrients to the site.

As noted above, the carrier gas can contain an amount of nutrient vapor up the vapor pressure of the liquid nutrient. Thus, if the vapor pressure $P_v$ of the liquid is 1 mm at a temperature T, the gas-vapor mixture may contain as much as 0.13 vol. % nutrient vapor. If the vapor pressure is 5 mm, the mixture may contain 0.66 vol. % nutrient vapor. To ensure that adequate amounts of the nutrient are delivered to the bioremediation site, the nutrient liquid preferably has a vapor pressure of at least approximately 0.1 mm Hg at the injection temperature.

For delivery of phosphorus to contaminated soil, liquid organic phosphates are preferred, although inorganic phosphates with sufficiently high vapor pressures may be used. Suitable organic phosphates include triethyl phosphate ($C_6H_{15}O_4P$) and tributyl phosphate (($C_4H_9O)_3PO$). Triethyl phosphate is a liquid at environmental temperatures, with vapor pressures (in mm Hg) of 1 mm at 39.6° C., 5 mm at 67.8° C. and 10 mm at 82.1° C. Data on vapor pressures of many organic and inorganic compounds are available in various standard references, including the CRC Handbook of Chemistry and Physics, 71st Edition (1990), pp. 6-50–6-73. These data are incorporated herein by reference. Many volatile liquid organophosphates are not suitable for use with the invention due to their flammability and/or toxicity. For example, trimethyl phosphate ($C_3H_9O_4P$) has a vapor pressure 1 of mm of 26.0° C. (higher than the vapor pressure of triethyl phosphate), but is toxic and flammable; volatile organo-dichlorophosphates such as phenyl dichlorophosphate ($C_6H_5Cl_2O_2P$) are toxic. Therefore, candidate compounds for use with the invention are best chosen by evaluating the physical data (vapor pressure, molecular weight and volume, and so forth) in conjunction with reference data on toxicity and flammability, for example, the data available in Materials Safety Data Sheets (MSDS) provided by manufacturers.

Figure 3:
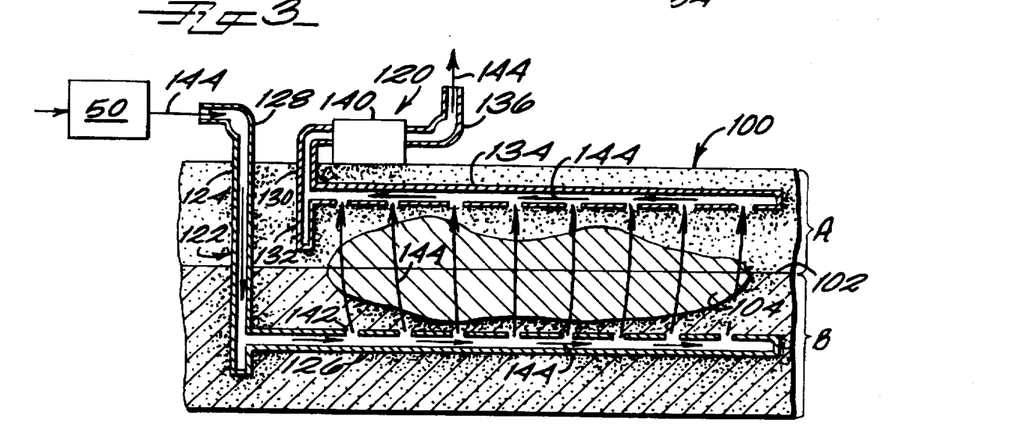
Figure 4:
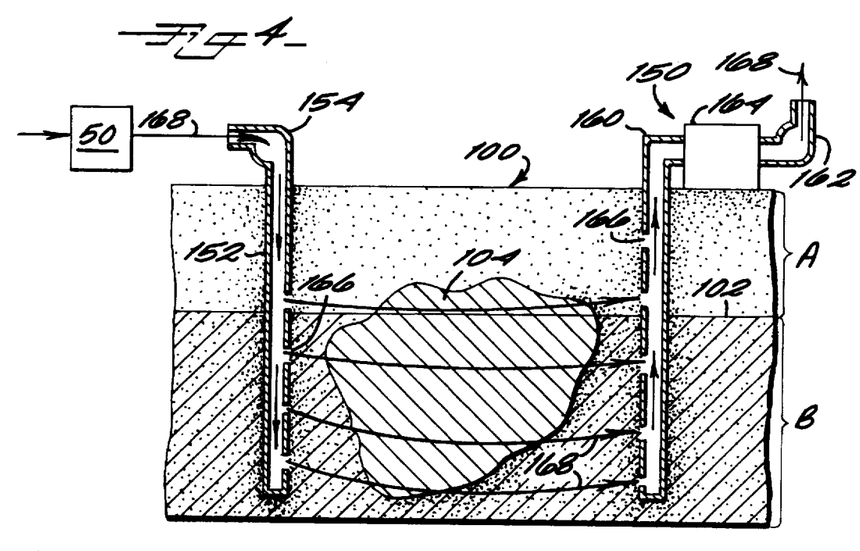

Apparatus 10 and apparatus 50 can be used to supply nutrient-enriched gas to any desired bioremediation apparatus, including systems with horizontal and vertical injection wells such as those shown in FIGS. 3 and 4. Referring now to FIG. 3, there is shown a cross-sectional view of a bioremediation site with an apparatus for delivering nutrient-enriched gas according to the present invention. The subsurface structure under the earth's surface 100 includes an upper, unsaturated (vadose) zone, indicated generally at A, and a lower, saturated zone, indicated generally at B. Zones A and B meet at a water table 102. A contaminant plume 104 lies below surface 100, located partly in zone A and partly in zone B, or entirely within one of zones A or B. Plume 104 may contain any of a variety of contaminants, including aromatics, alkanes, olefins, alcohols, esters, ketones, halogenated and chlorinated hydrocarbons, PCBs, dioxins and so forth. The term "contaminant" as used herein refers to any organic compound which is removable from the soil by bioremediation.

A remediation apparatus 120 includes an injection well system 122 having a shaft 124 leading to an injection well 126. A pump 128 is operatively connected to shaft 124. Injection well 126 is situated below plume 104 in saturated zone B. An extraction well system 130 is placed on an opposing side of plume 104, and includes a shaft 132, an extraction well 134 positioned above plume 104 in vadose zone A, and a pump 136. A testing module 140 in vadose zone A, and a pump 136. A testing module 140, to be described more fully below, may be operatively connected to shaft 132 and pump 136 in any convenient location.

Horizontal wells 126 and 134 each have a plurality of apertures 142, such as slots or perforations. Apertures 142 are large and numerous enough to allow gases to flow freely therethrough, but narrow enough to keep soil particles from blocking the flow. Alternatively, wells 126 and 134 may be surrounded by mesh sleeves (not shown) to prevent blocking of apertures 142 by soil particles but allow the free flow of gas out of well 126 and into well 134.

Another remediation apparatus 150 is shown in FIG. 4. Apparatus 150 includes an injection well 152 having a pump 154 operatively connected thereto. An extraction well 160, with a pump 162, is situated so that plume 140 is located between wells 152 and 160. A testing module 164 may be operatively connected to extraction well 160 and pump 162. Wells 152 and 160 each have a plurality of apertures 166 formed therein, similar in form and function to apertures 142 of above-described horizontal wells 126 and 134.

An apparatus for supplying vapor-phase nutrients, such as above-described apparatus 50 (or apparatus 10) is in fluid communication with shaft 124 of remediation apparatus 120 (shaft 152 of apparatus 150). If desired, second pump 62 of apparatus 50 (or pump 24 of apparatus 10) may serve as input pump 128, 154 of remediation apparatus 100, 150, respectively. Gas drawn through plume 104 by pumps 136, 162 may be recycled to input shafts 124, 152, respectively, or filtered as needed and vented to the atmosphere.

An additional alternative embodiment of the present invention makes use of a passive barometric pump to introduce the vapor into the well. The barometric pump allows for air or vapor flow based upon changes of surface barometric pressure relative to the subsurface barometric pressure.

A barometric pump of the type used in accordance with this invention is best described in reference to commonly owned U.S. Patent application Ser. No. 08/466,372 filed on May 22, 1995 and incorporated herein by reference. As seen in reference to FIGS. 5 and 6 of the present specification, a barometric pumping apparatus 200 is provided in which valve 232 is responsive to changes in atmospheric pressure. Valve 232 comprises a chamber 234 having a top 236 and bottom 238. Formed at chamber bottom 238 is a valve seat 240 which receives a ball 242. Valve seat 240 is preferably cone-shaped to ensure effective contact and sealing between ball and seat, but may also be a ring which receives ball 242. A cone-shaped (frustoconical) valve seat is also preferred since moisture or small particles appearing on seat 240 tend to slide off the seat and into the lower conduit. Valve seat 240 may be formed as a separate component by a process of injection molding and then installed in chamber 234 or may be formed by machining away an area of solid material in chamber 234.

Figures 5, 6:
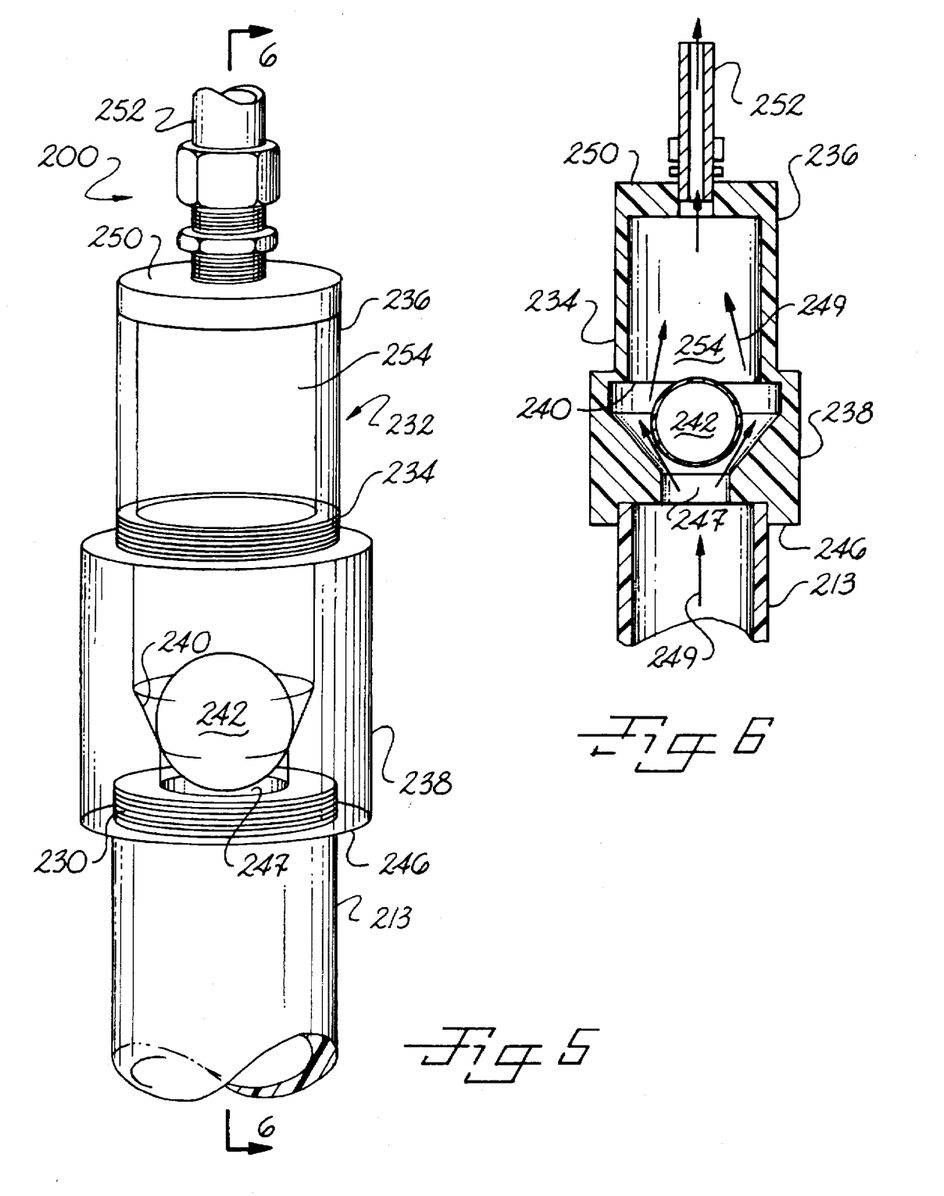

Ball 242 of chamber 234 is formed to be lightweight so that a slight pressure drop between the well and the atmosphere cause ball 242 to be lifted from seat 240. Ball 242 is formed of a lightweight material having a smooth outer surface which can form a seal with seat 240. Preferred materials from ball 242 are synthetic plastics. Ball 242 may be a commercially available table tennis ball.

Chamber 234 should be made of a non-corrosive, non-absorbent material such as stainless steel, Teflon,® or polyvinyl chloride. Preferably, chamber 234 is made of a transparent or semi-transparent material or is formed to have a window, so that valve 232 can be visually monitored for proper operation. Valve seat 240 of chamber 234 may be of the same material as the rest of chamber 234, but can be made of or coated with a soft and resilient material such as silicone or rubber for increasing the sealing action between ball 242 and seat 240.

Cracking pressure, the pressure causing ball 242 to separate from seat 240, is largely dependant upon the physical properties of the ball 242. Within the scope of the present invention, having a valve responsive to as low a cracking presser as possible is desired. When ball 242 is provided by a table tennis ball, cracking pressure is about 1 mbar. Therefor, a 1 mbar or greater pressure difference between the well and the atmosphere will crack valve 232.

Valve seat 240 defines an aperture 247 through which a stream of air or selected gas flows when valve 232 is cracked. Air stream, which can include a vapor component as well as heat and other nutrients, is indicated generally by arrow 249 of FIGS. 5 and 6. Stream 249 helps to lift ball 242 and can be accelerated to enhance valve lifting by narrowing the diameter of aperture 247 or by narrowing the passage size of the connecting lower conduit.

The barometric pump 200 and valve 232 can be oriented so that pump 200 can be used to control air flow out of or into the subsurface region of a well. When used as part of a passive pumping process, an upper conduit 252 is in further communication with a riser portion of a well. The lower conduit 213 is in open communication or responsive to atmospheric pressure so that when atmospheric pressure exceeds (by a cracking value) the pressure of the well's subsurface, the air flow is through the valve and into the subsurface portion of the well. It is therefor possible to make use of this airflow as a vehicle for the introduction of nutrients.

Figure 7:
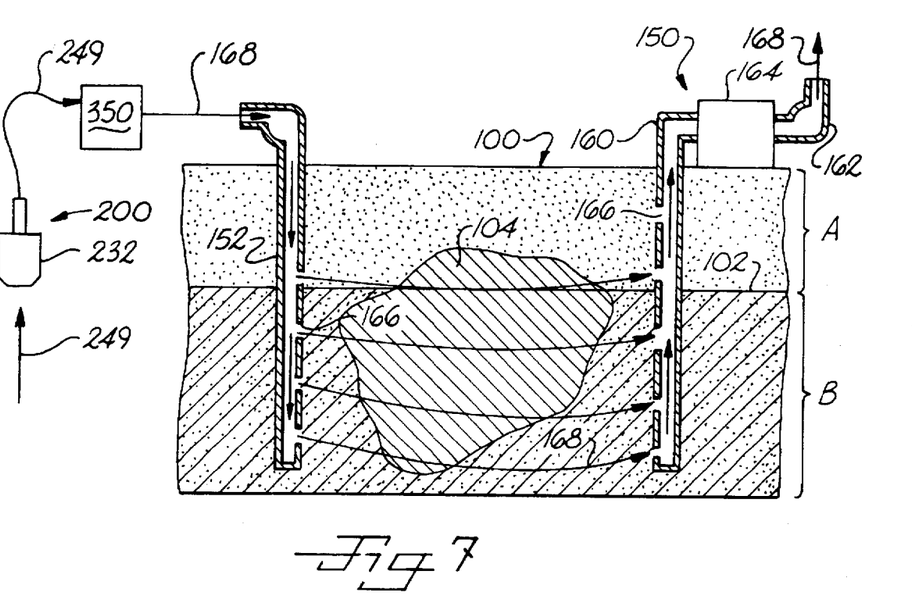
Figure 8:
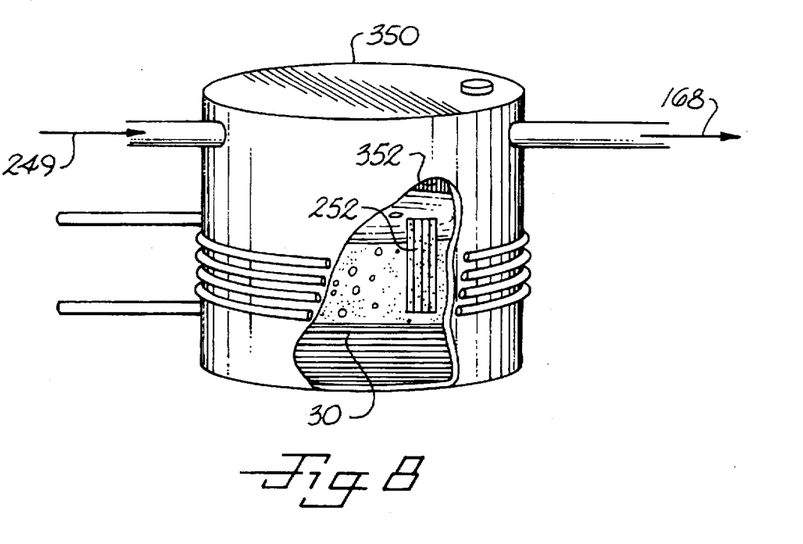

As seen in reference to FIG. 7, a schematic view of a passive nutrient supply apparatus is provided. When a cracking pressure is obtained, valve 232 of pump 200 is open and allows air to enter the valve, air flow being indicated by directional arrows 249. Air flow 249 exits the valve and is introduced into chamber 350. As seen in FIG. 8, chamber 350 is designed to supply vapor-phase nutrients into the passing air stream such as described for apparatus 10 and apparatus 50 of the present invention.

However, an entirely passive nutrient supply system is possible when chamber 350 simply comprises a receptacle for nutrient compounds along with a defined headspace volume within chamber 350. The headspace 352 provides a area for vapor pressure nutrients to accumulate. Air flow 249 is introduced via an inlet into the headspace region of chamber 350. As the air flow passes through the chamber headspace, air 249 mixes with the vapor phase nutrients. The resulting air/nutrient gas mixture 168 exits chamber 350 via an outlet and which is in further communication with well 152. The nutrient mixture is then released along apertures 166 of the well as previously described.

While flow rates as high as 35 lpm have been observed in a one inch diameter well with a five foot screen, more typical flow rates fall in the range of 2–5 lpm as detailed in the above referenced related application Ser. No. 08/466,372. Since flow rates vary for any given apparatus depending upon atmospheric pressure differentials, the amount of vapor phase nutrients introduced will vary. For a completely passive system, maximum nutrient release rate may not be obtained. However, a gradual release does occur over extended time periods without the energy costs and maintenance concerns of the more active systems.

If desired, the vapor phase within headspace 352 can also be increased by a recirculater carried inside chamber 350 which bubbles air from the headspace through the liquid nutrient. Such a recirculator can be solar or wind powered to minimize operating costs or to operate the apparatus at sites remote from utilities. The additional contact between the air and the nutrient liquid will increase the vapor pressure of the nutrient and hence the amount of nutrients introduced when the apparatus is injecting materials into the well. Using the pressure associated with air flow 249 to directly contact the liquid phase, while possible, is not preferred since the additional pressure to operate a sparger or other active contacting means would essentially limit the use of the apparatus to situations where high pressure differentials exist.

It is understood that the airflow through the apparatus is one way. When the pressure differential is below the cracking value for valve 232, no circulation occurs as ball 242 operates as a check against reverse flow from the well or chamber 350. As a result, the vapor phase nutrients do not escape from chamber 350 when valve 232 is closed.

While a conventional extraction well 160 is also set forth in FIG. 7, such a well is optional. Valve 232 permits air or air/vapor mixtures to be introduced into the subsurface regions of a well based solely upon the barometric pumping action. An extraction well or other gradient flow is not required.

The advantages of the passive injection system include that there are no energy costs associated with the barometric pump, the pump itself is easily constructed and has essentially no moving parts, and the pumping apparatus can be operated long term with little on-site maintenance required. Chamber 350 can be sufficiently large that a long term supply of the nutrients can be provided allowing the remediation apparatus to operate for extended periods without maintenance or supervision. It is recognized that the passive remediation apparatus and process does not operate in a continuous pumping mode and when it is operating may not introduce as great an amount/volume of nutrients as the active injection systems previously discussed. However, the apparatus's advantages of cost, simplicity, and low maintenance offer useful features for certain applications.

The present passive pump can also be combined with previously described heaters, injectors or sparging systems to increase the vapor concentration within the headspace of chamber 350. These active components could be regulated by sensors responsive to air flow through valve 232 so that when valve 232 is closed, injectors or other vapor concentrators are inoperative. The passive pump, by varying its connection, can be used for either injection or withdrawal of gases relative to the surface. The conventional pumps described in the application for active injection or extraction of gas, can be replaced with a passive barometric pump where field conditions or economic factors favor the low cost and low maintenance advantages of the passive pumps.

Chamber 350 can also be provided with one or more internal wicks 352 to promote the vaporization of the nutrient as air stream 249 passes through the chamber. Internal baffles can also be present to increase mixing of the vapor nutrient with the air stream.

Site characteristics such as the size and shape of plume 104, the types of contaminants in plume 104, the subsurface geology of the area, fluid flow rates in the area and drilling economics dictate the dimensions, the numbers of injection and extraction wells, and the orientation of apparatus 120, 150. For example, where plume 104 is situated partly or wholly in saturated zone B, horizontal wells may be preferable to help prevent spreading of plume 104 during treatment. The injection and extraction wells of the apparatus may be oriented at angles other than those shown in FIGS. 3 and 4, or the extraction wells may be omitted.

Treatment of plume 104 is initiated after placement of the remediation apparatus. The treatment process will be described with reference to a remediation apparatus 120 with a nutrient-supplying apparatus 50 as illustrated in FIG. 3. However, it will be understood that similar procedures are employed with apparatus 10 or 200 and any convenient injection/extraction well system.

The baseline microbial characteristics of the subsurface environment are determined before treatment. Site characterization data are obtained from test site core samples, and may include such analyses as acridine orange direct counts, aerobic heterotrophic plate counts, phospholipid fatty acid measurements, DNA probes, fluorescent antibody probes, plasmid frequency, total phosphorous and organic carbon, total nitrogen (measured by the Kjeldahl method, where an estimate of the total amount of nitrogen in an organic substance is made by measuring the amount of ammonia that can be formed from it, or other suitable techniques), nitrate, and so forth. Growth of subsurface microorganisms may be evaluated by visual inspection of groundwater samples, for example, subjective evaluation of sample turbidity and surface film growth in sample containers.

If desired, the site may be initialized by activating pump 136 to extract air from extraction well system 130 and establish a flow gradient across plume 104. The optimum extraction rate depends on the subsurface soil conditions and is best established by a modest degree of experimentation and observation for each particular site. Pump 136 draws gas, indicated generally by arrows 144 (arrows 168 of FIG. 4), from injection well 126 across plume 104 into extraction well 134.

At suitable intervals, off-gas samples are withdrawn at testing module 140 and assayed. The types of assays depend on the nature of the contaminants in plume 104, and may include tests for methane, oxygen, and hydrocarbon concentration, total volatile organic contaminants (VOC), TCE, polychloroethylene (PCE), and potential breakdown products of TCE and PCE (including cis-DCE, trans-DCE, vinyl chloride, and carbon dioxide). Alternatively, module 140 may include means for conducting the analyses. Contaminants may be removed before venting the off-gas to the atmosphere or recycling to input shaft 124, such as by filtering through an activated carbon filter. Pump 136 is operated until sampling confirms that steady state concentrations have been reached.

After steady state off-gas contaminant concentrations are reached, pump 128 injects a gas-vapor mixture, supplied by apparatus 50, into injection well 126 while pump 136 continues to draw off-gas from extraction well 134. The optimum flow rates of pumps 128 and 136 depend on the soil type. In order to maintain a flow gradient across plume 104, the extraction rate of pump 136 is preferably the same or higher than the injection rate of pump 128. However, depending on the nature and the amounts of contaminants in plume 104, hazardous contaminants removed by abiotic processes such as air stripping may need to be filtered from the extracted off-gas for subsequent disposal, increasing the expense of the remediation process. Nonhazardous end products of contaminants degraded in situ may be simply left in place. In addition, it is preferred that substantially all the nutrients supplied by apparatus 50 are dispersed throughout the treatment region rather than withdrawn via extraction well 134. Therefore, the extraction rate is chosen to optimize the supply of nutrients to plume 104 while minimizing air stripping, preferably to a value no more than approximately 20% higher than the injection rate. By way of example, for sandy soils where the extraction rate of pump 136 is 240 SCFM (standard cubic feet/min; about 6.8 m$^3$/min or 6.8× 10$^3$ L/min), the preferred injection rate of pump 128 is approximately 200 SCFM (about 5.7 m$^3$/min).

The mixture of carrier gas and nutrient vapor is drawn across plume 104 to stimulate growth and reproduction of indigenous microorganisms. The increased availability of nutrients due to injection of the carrier gas and nutrient vapor mixture stimulates greatly increased growth and reproduction of indigenous subsurface microorganisms. These microorganisms, in turn, degrade the contaminants in plume 104.

Injection of the gas-vapor mixture continues until contaminant concentrations in plume 104 are reduced to acceptable levels. The time required for treatment depends on the size of plume 104, the concentration of contaminants in the plume, the local subsurface soil conditions, the types of microorganisms at the site, and the flow rates of pumps 128 and 136. Soil, groundwater and off-gas samples may be collected and tested at intervals during treatment for measuring concentrations of the contaminants at various positions in plume 104, concentrations of subsurface microorganisms, temperature, pH, dissolved oxygen, conductivity, and oxidation-reduction potential. VOC analyses may be performed on groundwater and off-gas samples, including measurements of methane, and potential daughter products of the contaminants. Bacterial counts may be obtained by any convenient method.

Apparatus 50 supplies a mixture of vapor-phase phosphates and carrier gas to the site. The phosphate vapor provides phosphorous, a necessary nutrient for growth and reproduction of the subsurface microorganisms. The gas is selected depending on the types of contaminants that are found in plume 104. For many types of contaminants, air is preferred because of its low cost. However, other gases including oxygen ($O_2$), nitrogen ($N_2$), nitrous oxide ($N_2O$), ammonia ($NH_4$), methane ($CH_4$) and propane ($CH_3CH_2CH_3$) may be added if desired. For contaminants that are biodegradable by aerobic microorganisms, the carrier gas is air, oxygen-enriched air, or a nitrogen-oxygen mixture. For contaminants that are degradable by anaerobic microorganisms, the mixture contains nitrogen. Sites contaminated with gasoline, oils and other similar hydrocarbons may need only vapor-phase phosphates and air. When plume 104 contains chlorinated solvents, carbon (methane, propane, carbon dioxide) may be added to provide energy to support the growth of suitable microbial communities. By way of example, if plume 104 contains TCE, a suitable gas mixture includes air and methane in a concentration of less than approximately 5 vol. %, as described in aforementioned patent application Ser. No. 07/935,950.

Preferably, the nutrients supplied by apparatus 50, together with the nutrients already available at the site, optimize the growth of suitable contaminant-degrading microorganisms and the contaminant degradation rate. Microorganisms are known to contain carbon, nitrogen and phosphorous in approximately constant relative concentrations, known as the "bulk" or "biomass" C:N:P ratio. Since the microorganisms utilize carbon, nitrogen and phosphorous as nutrients in approximately the same proportions as the bulk C:N:P ratio, optimum growth and reproduction of a microbial community is seen when these elements are available in approximately that ratio. Use of the bulk C:N:P ratio for process control allows regulation of the microbial community and contaminant degradation rate to maximize contaminant decay without overstimulating or clogging the formation. The C:N:P ratios of living organisms are generally similar, however, different types of microorganisms may differ in their ability to utilize various nutrients. The uptake of nutrients by microorganisms may also depend on the ambient environmental conditions, including the types of contaminants present at the site, soil pH, oxidation-reduction potentials and availability of water. In addition, differential absorption various nutrients by the soil may affect the availability of those nutrients throughout the site. Thus, the optimum C:N:P ratio of the injected gas-vapor mixture is site-specific, and is best selected based on the types of soil present at the site, the types of microorganisms and the types of contaminants to be degraded.

Alternatively, the site may be assayed to determine the availability of needed nutrients, and only those nutrients which are needed to stimulate the growth of suitable contaminant-degrading microorganisms are supplied. According to Liebig's Law of the Minimum, those essential nutrients for which the ratio of supply to demand reaches a minimum will be the first to be removed from the environment. Therefore, the growth of a microbial community is limited by the supply of the least-abundant nutrient, generally phosphorus. The composition of the gas-vapor mixture may be adjusted to provide additional phosphorus (and other nutrients as needed) so that the C:N:P ratio of the available nutrients at the site is approximately equal to the bulk C:N:P ratio.

During treatment, the composition of the gas-vapor mixture may be adjusted depending on the results of the above-described tests. For example, the flow rate of pump 128 may be changed to inject more or less of the gas-vapor mixture, the concentration of phosphorus in the mixture may be increased to stimulate growth of the microbial community and increase the contaminant degradation rate, the phosphorus concentration may be reduced to prevent clogging, and so forth.

An apparatus according to the present invention was tested by drilling a horizontal well approximately 300' (about 91 m) long and 150' (about 46 m) deep below a contaminant plume (similar to well 126 of FIG. 3). The well was approximately 30'–40' (about 9–12 m) below water table 102, and was used to inject air, other gases, and vapor-phase phosphates into the site. An extraction well such as well 134, approximately 175' (about 53 m) long and 75' (about 23 m) deep in vadose zone A, was used to extract residual contamination above water table 102, extract material sparged from the water table 102, and control the distribution and migration of injected nutrient gases. The site was contaminated with chlorinated solvents, necessitating the addition of carbon to provide energy to support growth of the subsurface microbial community.

Gases supplied to the site included $O_2$ and $N_2$ (as air), $CH_4$, $N_2O$, and vapor-phase phosphorous (triethyl phosphate, TEP). The test included the following steps: (1)

continuous vacuum extraction from well 134; (2) continuous air injection into well 126; (3) continuous injection of air containing 1 vol. % $CH_4$; (4) continuous injection of air containing 4 vol. % $CH_4$; (5) continuous injection of air with periodic pulses of $CH_4$ (1 vol. %; 4 vol. %); and (6) injection of a mixture of air, $N_2O$ and TEP with periodic pulses of $CH_4$ (1-4) vol. %). Vacuum extraction from well 134 continued during steps (2)-(6).

Data were collected throughout the test to evaluate the progress of biodegradation at the site. Key indicators included fluorescent antibody counts of known contaminant-degrading microorganisms, DNA probes and chemical measurements to determine the expression of contaminant-degrading enzymes, measures of microorganism numbers and types, chemical measurements (including measurements of daughter products and breakdown products of contaminants) and TCE mineralization analyses.

TCE mineralization analyses proved to be a good performance indicator, correlating well with the other measures listed. Analysis consisted of a comparison of the rate of disappearance of $^{14}C$-labeled TCE in groundwater samples and controls over a period of two days. $^{14}C$-labeled TCE was injected into sealed tubes containing 10 mL of groundwater taken from plume 104 and incubated at the original in situ temperature for 48 hours. The radioactive and nonradioactive $CO_2$ concentration in the samples was determined using gas chromatography and gas proportional counting.

Phosphorus was supplied in the form of vapor-phase triethyl phosphate (TEP). TEP was selected based on its relatively high vapor pressure (1 mm at 37.6° C.), low toxicity and low flammability. In addition, TEP is less soluble in water, less reactive and less corrosive than many solutions of phosphorus compounds (including phosphoric acid), resulting in the potential for more uniform spread into plume 104 as well as reduced handling and engineering problems. While not wishing to be bound by theory, the presence of organic groups suggests the possibility that microbial stimulation will be more uniform (i.e., "time released") because of the need to convert the TEP to orthophosphate through biological removal of the organic chains.

An initial laboratory study demonstrated that vapor-phase TEP could be utilized by the microbial community in a manner analogous to inorganic orthophosphate. TCE mineralization tests were performed with several combinations of nutrients. Mineralization rates were measured on a relative scale, with 0 being the lowest observed rate and ++++ the highest. The results were as follows:

| Nutrient(s) | Mineralization Rate (0–++++) |
|---|---|
| $CH_4$, $NH_4$ | +++ |
| $CH_4$, inorganic orthophosphate | ++++ |
| $CH_4$, TEP | ++++ |
| $CH_4$, $N_2O$ | ++ |
| $CH_4$, $NH_4$, TEP | +++ |
| $NH_4$ | + |
| $CH_4$ | 0 |

The lowest mineralization rate (0) was for $CH_4$ alone; the highest rates (++++) were found for $CH_4$ and inorganic orthophosphate, and $CH_4$ and TEP. These results demonstrated that vapor-phase TEP stimulated and could be utilized by the contaminant degraders in the microbial community. Therefore, TEP was selected for the vapor-phase nutrient injection (step (6)).

As discussed above, the attainable concentration of TEP vapor in the gas-vapor mixture is limited by the vapor pressure of liquid TEP. Thus, if the vapor pressure is 1 mm at the gas injection temperature, the gas-vapor mixture may contain as much as 0.13 vol. % TEP. A TEP concentration of 0.007 vol. % was selected for the test, based on optimizing the C:N:P ratio in the injected gas. Carbon, nitrogen and phosphorus were supplied in a ratio of approximately 100:50:5, similar to the bulk composition of suitable contaminant-degrading microbial cells at the test site.

For an air injection rate of 200 SCFM (about 5.7 $m^3$/min or $5.7 \times 10^3$ L/min), the target flow rate of vapor-phase TEP was 0.014 SCFM (about 0.4 L/min). The molecular weight and volume of TEP at atmospheric pressure are 182.2 g/mole and 24.5 L/mole, respectively. Therefore, the flow rate of pump 56 was selected to inject 2.95 g/min (2.75 mL/min) of liquid TEP into conduit 52, or approximately 1.06 gallons/day (about 4.0 L/day) liquid TEP. A total of 100 gallons (about 380 L) of TEP was volatilized into the air-nitrogen mixture over a period of 93 days.

TCE mineralization results indicated that TEP injection performed as expected. Prior to addition of phosphorus, the sitewide 48-hour mineralization rates ranged from 0% to 3% with a mean of about 2.5%. During the addition of TEP, the sitewide 48-hour mineralization rates increased, ranging from 3% to 26% with a mean of about 15%. Upon addition of TEP, the concentration of chlorinated solvents in soil gas samples from above water table 102 dropped substantially and rapidly. These results indicate that the phosphorus stimulated contaminant-degrading microorganisms in the groundwater, while the concentration changes above water table 102 indicate that the added phosphorus impacted a relatively large region, passing through the 30'-40' (about 9-12 m) of water-saturated soil into vadose zone A.

Apparatus 10, apparatus 50, and apparatus 200 may be used with injection and extraction wells configured to the particular site. Treatment regimens may include continuous air-phosphate injection, injection of phosphates and other nutrients (nitrogen, methane, etc.), and pulsed treatment as described in aforementioned application Ser. No. 07/935, 950. A mixture of vapor-phase phosphates, oxygen and methane may be injected periodically to stimulate growth and reproduction of subsurface methanotrophs, and a phosphate-oxygen mixture injected continuously. The treatment cycle is repeated until the contaminant concentration is reduced to acceptable levels. It will be evident that, by an appropriate choice of gases and other nutrients, pulsed treatment may be used for stimulating microorganisms other than methanotrophs.

A remediation apparatus as described above provides significant advantages over presently-available nutrient delivery techniques. The use of volatile liquid nutrients allows the efficient, controlled delivery of the nutrients in vapor form. Because liquids typically have much higher vapor pressures than solutions of solid compounds or the solids themselves, the gas-vapor mixture can contain high concentrations of nutrients for stimulating growth of contaminant-degrading microorganisms. The vaporized nutrients are dispersed throughout the contaminated site, avoiding the problems of plugging and microbial overgrowth that are found with liquid injection. The use of injection and extraction wells configured to the site allows efficient delivery of the gas-nutrient vapor mixture.

Biodegradation of contaminants by indigenous subsurface microorganisms provides an effective pathway for removal of the contaminants, and use of the invention results in significant reductions in the time required to complete treatment. Furthermore, the microorganisms can access subsurface formations that may be difficult to access by air stripping alone. Microorganisms are known to biodegrade hundreds of organic compounds, including TCE, PCE, benzene, toluene, and xylene. These pollutants are widespread, and must be reduced to very low levels (less than 5 ppb) for groundwater to be considered non-polluted.

It will be apparent to those skilled in the art that many changes and substitutions can be made to the preferred embodiment herein described without departing from the spirit and scope of the present invention as defined by the appended claims.

What is claimed is:

1. An apparatus for supplying a nutrient to a subsurface region, said region containing microorganisms that are capable of degrading contaminants present in said region, said nutrient having a vapor form and a liquid form with a vapor pressure, said apparatus comprising:

a housing having an interior, said housing adapted for containing a quantity of said liquid nutrient;

a temperature regulator for controlling a temperature of said liquid nutrient;

a conduit in fluid communication with said interior of said housing;

means for causing a gas to flow through said conduit;

means for contacting said gas with said liquid nutrient so that a portion of said liquid nutrient vaporizes and mixes with said gas, a mixture of said gas and said vaporized nutrient having a partial pressure of nutrient vapor no greater than said vapor pressure; and means for delivering said mixture into said subsurface region to promote growth and reproduction of said microorganisms.

2. The apparatus as recited in claim 1, wherein said vapor pressure is dependent on said temperature so that said vapor pressure is changed thereby.

3. The apparatus as recited in claim 1, wherein said gas-contacting means further comprises a pump, said pump injecting said liquid nutrient into said flowing gas so that said injected nutrient vaporizes and mixes with said gas.

4. The apparatus as recited in claim 1, wherein said housing has an inlet and an outlet, and wherein said gas-contacting means further comprises a gas-liquid contactor contained in said housing, said contactor receiving said gas at said inlet, said contactor releasing a mixture of said gas and said vaporized nutrient at said outlet.

5. The apparatus as recited in claim 1, wherein said gas has a flow rate, wherein said liquid nutrient has a molecular weight and a density, and wherein said gas-contacting means further comprises means for adding a quantity of said liquid nutrient into said gas at a flow rate no greater than approximately $Q=4.1\times10^{-5}(w/d)\beta_1 Q_{gas}$, where $Q_{gas}$ is said flow rate of said gas in L/min, $\beta_1$ is said vapor pressure in atm, w is said molecular weight in g/mole and d is said density in g/cm$^3$.

6. The apparatus as recited in claim 1, wherein said housing has an inlet and an outlet, and wherein said causing means further comprises:

a first pump for pumping said gas into said inlet; and a second pump for pumping said gas from said outlet.

7. The apparatus as recited in claim 1, wherein said delivering means further comprises:

at least one injection well adjacent said region;

at least one extraction well adjacent an opposing side of said region; and means for causing said mixture to flow from said injection well towards said extraction well so that said mixture is dispersed through said region.

8. An apparatus for supplying a nutrient to a subsurface region, said region containing microorganisms that are capable of degrading contaminants present in said region, said nutrient having a vapor form and a liquid form with a vapor pressure, said apparatus comprising:

a housing having an interior, said housing adapted for containing a quantity of said liquid nutrient;

a conduit in communication with a head space defined by said interior of a housing;

a barometric pump for causing a gas to flow through said conduit so that a vaporized portion of said liquid nutrient mixes with said gas, a mixture of said gas and said vaporized nutrient having a partial pressure of nutrient vapor no greater than said vapor pressure; and means for delivering said mixture into said subsurface region to promote growth and reproduction of said microorganisms.

9. The apparatus according to claim 8 wherein said barometric pump further comprises a housing, said housing defining an upper conduit and a lower conduit, said first conduit in communication with the well and said second conduit being open to an atmosphere pressure;

a chamber defined within said housing, said chamber further defining a valve seat; and a ball disposed in said valve seat, said ball being sized such that a pressure differential between said well and said atmosphere lifts said ball from said valve seat.

10. An apparatus for supplying a nutrient to a subsurface region, said nutrient having a vapor form and a liquid form, said apparatus comprising:

a valve in communication with a lower inlet and an upper outlet, said inlet in communication with an above ground atmospheric pressure and said outlet in communication with a subsurface region of a well, said valve further defining a ball seated within said valve, said ball opening said valve when said above ground atmospheric pressure exceeds by a cracking value the pressure of said subsurface region;

a chamber defining a reservoir for a liquid nutrient and a headspace for the accumulation of a vapor phase of said nutrient, said chamber further defining an inlet and an outlet, said inlet and said outlet in communication with said headspace, said chamber inlet in further communication with said valve outlet and said chamber outlet in further communication with said subsurface region;

wherein, when said ball of said valve is in an open position, air flows through said valve and enters said headspace through said chamber inlet, said air mixing with said nutrient vapor phase within said headspace to form a gaseous mixture, said mixture leaving said head space through said chamber outlet and entering said subsurface region.

* * * * *